H. J. FREYN.
GAS BURNER.
APPLICATION FILED OCT. 23, 1915.
1,233,461.
Patented July 17, 1917
2 SHEETS—SHEET 1.
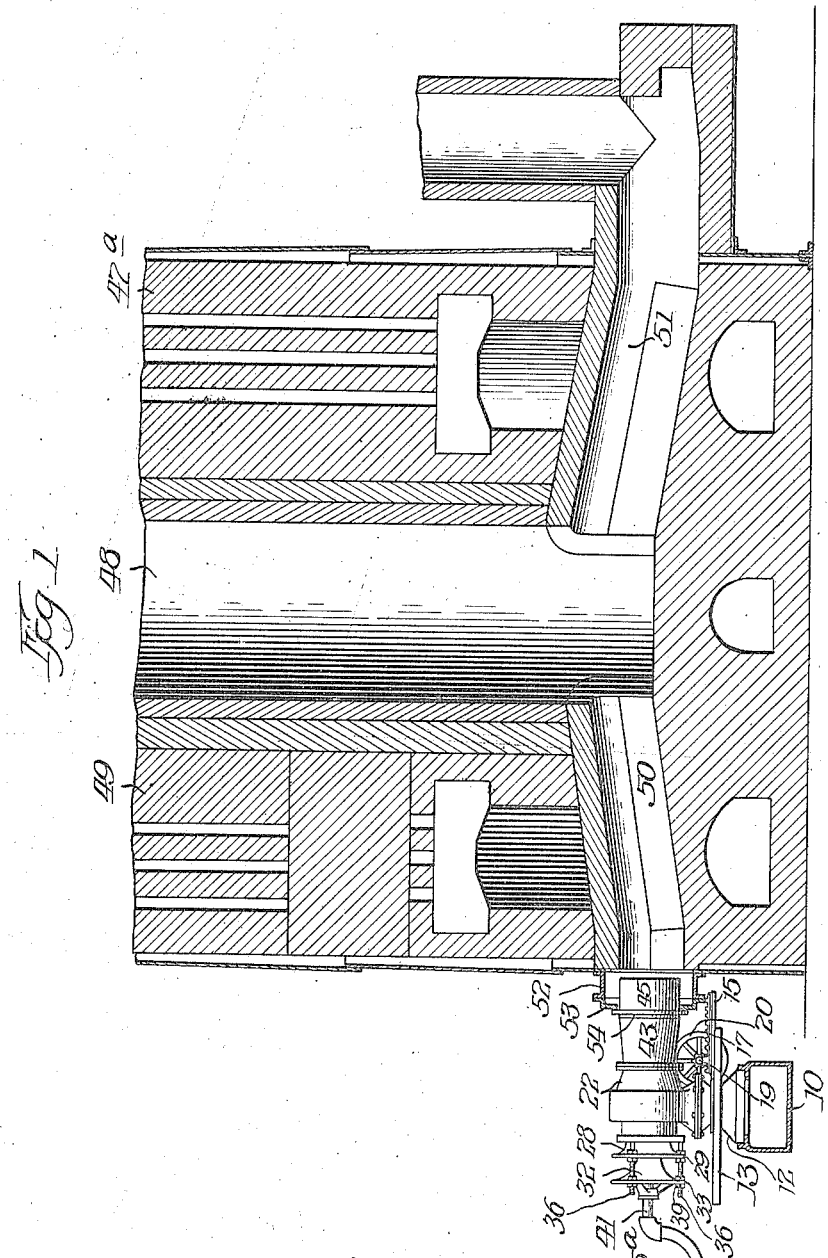
Witnesses:
Inventor:
Heinrich J. Freyn
By
Attys.

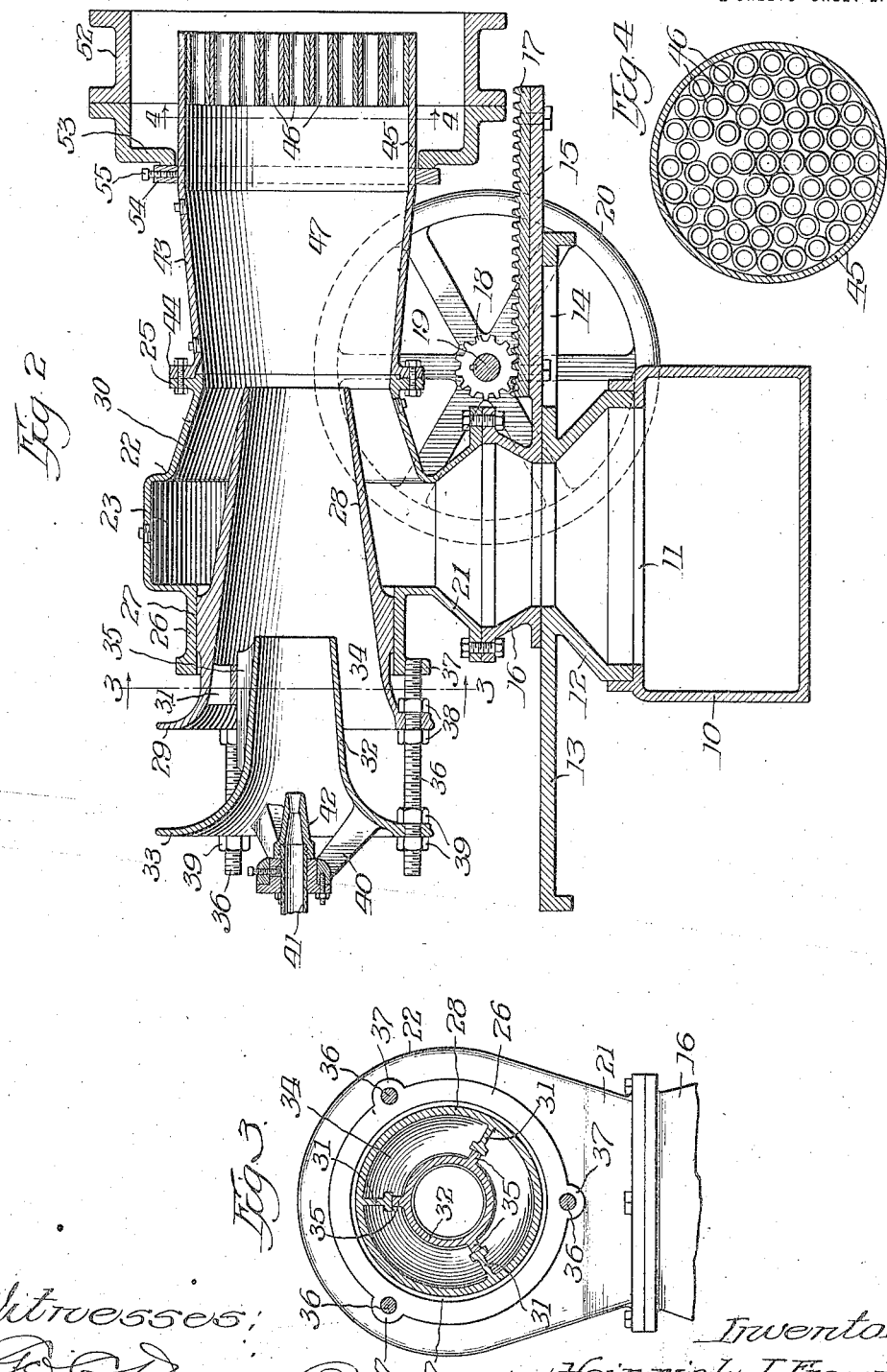

UNITED STATES PATENT OFFICE.

HEINRICH J. FREYN, OF CHICAGO, ILLINOIS, ASSIGNOR, BY MESNE ASSIGNMENTS, TO FREYN AND COMPANY, OF CHICAGO, ILLINOIS, A CORPORATION OF MAINE.

GAS-BURNER.

1,233,461.　　　　　Specification of Letters Patent.　　Patented July 17, 1917.

Application filed October 23, 1915.　Serial No. 57,424.

*To all whom it may concern:*

Be it known that I, HEINRICH J. FREYN, a citizen of the United States, residing at Chicago, in the county of Cook and State of Illinois, have invented certain new and useful Improvements in Gas-Burners, of which the following is a specification.

My invention relates to gas burners, and refers particularly, although not exclusively, to gas burners of relatively large size which are especially adapted for use in connection with blast furnace stoves.

The object of my invention is to provide a burner in which the supply of air which is mixed with the gas may be readily controlled, while at the same time the mixture of gas and air is thorough, and means are provided by which back-firing is effectually prevented.

I attain the object which I have mentioned by providing a tapering main air inlet tube which projects into a tapering gas inlet passage, the inner end of this air inlet tube being located substantially in the plane of the end of the gas inlet passage. The main air inlet tube is preferably bell-shaped at its outer end, and carries an auxiliary air inlet tube, also bell-shaped and inwardly tapering, means being provided by which the main and auxiliary air inlet tubes can be regulated with respect to each other and with respect to the gas inlet passage. The auxiliary air inlet tube carries at its outer end an injector pipe by means of which air or other fluid may be introduced into the auxiliary air inlet tube, thereby causing additional air to be drawn into the latter by the action of the high-pressure fluid passing through the injector. The nozzle of this injector is preferably diverging, thereby causing the entire body of air passing from the auxiliary air inlet tube to be of uniform velocity throughout its entire cross-section. When the air passes from the auxiliary air inlet tube to the main air inlet tube still additional air is drawn into the latter through the annular space between the auxiliary air inlet tube and the main air inlet tube. This additional air becomes thoroughly mixed with the air introduced from the auxiliary air inlet tube, so that the entire body of air as it leaves the main air inlet tube and passes into the mixing chamber of the burner is of uniform velocity throughout its cross-sectional area. This mixing chamber is preferably diverging, thereby causing a very intimate mixture between the air and gas when the two come together. At the inner end of the mixing chamber I preferably employ a large number of short sections of pipe, completely filling the cross-sectional area of the mixing chamber, in order to prevent back-firing, while at the same time these pipes do not noticeably interfere with the flow of the gas and air mixture and do not become readily clogged with dirt, as is the case when a screen or other similar device is employed for the purpose mentioned. By means of the burner which I have described I have found that a very complete control of the burner is possible and that a high efficiency of operation is obtained.

These and other advantages of my invention will be more readily apparent by reference to the accompanying drawings, which show a preferred embodiment of my improvements, and in which—

Figure 1 is a vertical longitudinal section through the lower portion of a blast furnace stove, showing my burner as applied thereto and connected with the cold blast main;

Fig. 2 is a vertical longitudinal section through the burner;

Fig. 3 is a vertical transverse section taken on the line 3—3 of Fig. 2; and

Fig. 4 is a vertical transverse section taken on the line 4—4 of Fig. 2.

The gas main 10 is provided with the aperture 11, communicating with which is the tapered connecting pipe 12 leading to the supporting platform 13, which may be provided with the aperture 14 to lighten the weight of the platform. Resting on the platform 13 is the plate 15 having the outwardly-flaring pipe section 16, which is adapted to be brought into register with the connecting pipe 12. The plate 15 carries the ratchet 17 engaged by the pinion 18 which is mounted on the shaft 19 supported in suitable bearings, the hand-wheel 20 also being mounted on this shaft 19.

To the upper end of the pipe section 16 is bolted the flanged lower end of the flared pipe section 21 of the casing 22. This casing 22 is provided with the annular gas chamber 23, and tapers inwardly from the gas chamber 23 to the flange 25 at the inner end of the casing 22.

The outer end of the casing 22 is provided with a sleeve portion 26 of uniform diameter which is adapted to receive the bearing ring 27 formed integral with the main air tube 28. This air tube 28 tapers from its outer to its inner end and at its outer end is provided with the flaring bell-shaped mouth 29. The inner end of the main air tube 28 is in substantially the same plane as the inner end of the casing 22, but the exact position of the air tube 28 may be varied by moving this air tube longitudinally on its bearing ring 27 within the sleeve 26. Between the inner end portion of the tube 28 and the tapering portion of the casing 22 the annular gas passage 30, of decreasing cross-sectional area toward its inner end, is formed, and it will be evident that by moving the air tube 28 inwardly or outwardly, as the case may be, the cross-sectional area of the gas passage 30 may be varied and the volume of gas passing through this passage correspondingly regulated. Near the outer end of the main air tube 28 are provided the centering guides 31.

The tapering auxiliary air tube 32 having the bell-shaped outer end 33 extends into the outer end of the main air tube 28, the annular air passage 34 being thereby formed. The longitudinally disposed bearing flanges 35 on the auxiliary air tube 32 engage the centering guides 31, thereby maintaining the auxiliary air tube 32 in central position with respect to the main air tube 28.

The bolts 36 (preferably three in number) extend through the outer ends 33 and 29 of the auxiliary and main air tubes 32 and 28, respectively, into suitable threaded apertures formed in the lugs 37 of the sleeve 26. The nuts 38 on the bolts 36 engage opposite faces of the end 29 of the main air tube 28, and the nuts 39 engage opposite faces of the end 33 of the auxiliary air tube 32. It will be evident that by proper regulation of the nuts 38 and 39 the positions of the main air tube 28 and the auxiliary air tube 32 with respect to the casing 22 and also with respect to each other may be varied as desired. By moving the auxiliary air tube 32 longitudinally it will be evident that the cross-sectional area of the air inlet passage 34 may be varied.

The auxiliary air tube 32 is provided at its outer end with a spider 40 which serves to support the end of the high pressure fluid pipe 41 provided with the nozzle 42. The pipe 41 is connected with a source of high-pressure air or other fluid such as steam, in the manner which will presently be described. The nozzle 42, as clearly shown in Fig. 2, has a passage therethrough in the shape of a Venturi tube. The inner end of the passage through the nozzle 42 flares outwardly at such an angle that a continuation of the sides thereof would strike the auxiliary air tube 32 approximately at the periphery of the inner end of said tube, so that the air or other high-pressure fluid passing through this nozzle will be directed in a diverging stream which when it reaches the inner end of the auxiliary tube 32 will substantially fill the entire cross-sectional area of this tube. As will be explained more in detail hereafter, the nozzle 42 acts as an injector, and serves to draw air into the tube 32 through the belled outer end of the same.

The mixing chamber casing 43 is connected at its flanged outer end 44 with the flange 25 of the casing 22. The inner surface of the casing 43 is continuous with the inner surface of the casing 22, and diverges from the flange 25 to its straight end portion 45. The end portion 45 contains at its inner end a plurality of comparatively short pipe sections 46. It will be evident that within the casing 43 is formed the mixing chamber 47, the function of which will be described more in detail hereafter.

The burner which I have described is particularly adapted to be used in connection with blast furnace stoves, as illustrated in Fig. 1. The stove, represented as a whole by 47ª, may have the central combustion chamber 48 and the annular checker chamber 49 of well known construction. The usual gas inlet passage 50 leads to the combustion chamber 48 and the passage 51 leads to the hot blast main. The gas burner of my invention is applied to the outer end of the passage 50, a tight connection between the burner and stove being attained by means of the closure 52 carried by the stove. This closure 52 has the flange 53, which engages the collar 54 adjustably attached to the casing member 43 of the burner by the bolts 55. In order to supply the compressed air to the burner I prefer to connect the pipe 41 through the flexible coupling pipe 55ª with the pipe 56 connected with the cold blast main 57. The pipe 56 has therein the valve 58 by which the amount of compressed air passing to the burner may be regulated. By connecting the burner in the manner just described with the cold blast main 57, which, in turn, leads directly from the blowing engines, it will be evident that no special air compressors are necessary, but the air which is compressed for use in the blast furnaces is utilized to operate the burners.

Having thus described the construction of the various parts which are used in connection with my invention, the operation of the same may now be readily understood:

The burner being in the position shown in Figs. 1 and 2, gas passes from the gas main 10 through the connecting pipes 12, 16 and 21 to the annular gas chamber 23, from which it passes through the passage 30 to the mixing chamber 47. As the gas passes the inner end of the main air inlet tube 28, air is drawn through this tube and mixes with the gas in the mixing chamber 47. The amount of air thus mixed with the gas is not usually, however, sufficient to produce the proper mixture, and for this reason compressed air is admitted through the pipe 41 and the nozzle 42. The nozzle has the action of an injector, and the air passing through the same directed in a diverging stream draws additional air into the auxiliary air tube 32 through its bell-shaped outer end 33. When this mixture of compressed and atmospheric air reaches the inner end of the tube 32 the stream of air passing from the nozzle 42 has diverged sufficiently to fill the entire opening at the inner end of the tube 32, and the air passing through the latter is at uniform velocity throughout the entire cross-sectional area of the tube. This air passing into the main air tube 28 draws still additional air through the annular air passage 34. The complete body of air finally passes through the inner end of the main air tube 28 into the mixing chamber 47, where it is thoroughly mixed with the gas entering through the annular passage 30. When the pressure of gas is somewhat low this air passing through the tube 28 has an aspirating effect, and serves to draw the gas from the main 10 into the mixing chamber 47. The amount of gas may be regulated by moving the main air tube 28 longitudinally, as previously described, and the amount of air admitted through the passage 34 may be regulated by moving the auxiliary air tube 32 longitudinally with respect to the main air tube 28.

After the gas and air have entered the mixing chamber 47 they become thoroughly mixed with each other. This effect is produced on account of the fact that when the gas and air enter the mixing chamber each is at its maximum velocity, since the air tube 28 tapers inwardly and the gas passage 30 is of less cross-sectional area at its inner end than at its outer end. When the gas and air reach the mixing chamber, on account of the fact that the casing 43 increases in diameter from its flanged end 44 to the end portion 45, the gas and air expand, and thereby become thoroughly mixed. This mixture then passes through the pipes 46 into the passage 50 of the blast furnace stove, where combustion begins to take place. The pipes 46 effectually prevent back-firing into the mixing chamber 47.

When it is desired to remove the burner from the stove the hand-wheel 20 is rotated, thereby causing the pinion 19 acting on the ratchet 17 to move outwardly the entire structure supported by the plate 15. The plate 15 covers the connecting pipe 12 so that no further gas can pass from the gas main 10.

It will be apparent to those skilled in the art that many changes could be made in the detailed construction of the various parts which I have described without departing from the spirit or scope of my invention, as defined in the appended claims.

What I claim is:

1. In a gas burner, the combination of a gas inlet passage, a main air inlet tube projecting into said gas inlet passage, an auxiliary air inlet tube projecting into the outer end of said main air inlet tube and forming an air inlet passage between the outer surface of said auxiliary air inlet tube and the inner surface of said main air inlet tube, and means for introducing a fluid under pressure into said auxiliary air inlet tube.

2. In a gas burner, the combination of a gas inlet passage, a tapering main air inlet tube projecting into said passage, a tapering auxiliary air inlet tube projecting into the outer end of said main air inlet tube and forming an annular air inlet passage between the outer surface of said auxiliary air inlet tube and the inner surface of said main air inlet tube, and injector means carried by said auxiliary air inlet tube for introducing fluid under pressure into said auxiliary air inlet tube, said injector means being provided with a nozzle adapted to direct said fluid in a diverging path to substantially fill the cross-sectional area of the inner end of said auxiliary air inlet tube.

3. In a gas burner, the combination of a casing having a converging gas inlet passage therein, a tapering main air inlet tube projecting into said gas inlet passage and having its outer end outside of said casing, a tapering auxiliary air inlet tube projecting into the outer end of said main air inlet tube and forming an annular air inlet passage between the outer surface of said auxiliary air inlet tube and the inner surface of said main air inlet tube, a diverging mixing chamber continuous with said gas inlet passage, and means for introducing a fluid under pressure into said auxiliary air inlet tube.

4. In a gas burner, the combination of a gas inlet passage, an air inlet tube having communication with said gas inlet passage, and injector means carried by said air inlet tube for introducing fluid under pressure into said tube, said injector means being provided with a nozzle adapted to direct said fluid in a diverging path to substantially fill the cross-sectional area of the inner end of said air inlet tube.

5. In a gas burner, the combination of a gas inlet passage, a main air inlet tube projecting into said gas inlet passage, an auxiliary air inlet tube projecting into the outer end of said main air inlet tube and forming an air inlet passage between the outer surface of said auxiliary air inlet tube and the inner surface of said main air inlet tube, and injector means carried by said auxiliary air inlet tube for introducing fluid under pressure into said auxiliary air inlet tube, said injector means being provided with a nozzle adapted to direct said fluid in a diverging path to substantially fill the cross-sectional area of the inner end of said auxiliary air inlet tube.

In witness whereof, I hereunto subscribe my name this 21st day of October, A. D. 1915.

HEINRICH J. FREYN.